Patented Dec. 15, 1942

2,304,777

UNITED STATES PATENT OFFICE 2,304,777

RUBBER COMPOUNDING

Theodore Adolph Bulifant, Hackensack, N. J., assignor, by mesne assignments, to Allied Chemical & Dye Corporation, a corporation of New York No Drawing. Application December 20, 1938, Serial No. 246,851

14 Claims. (Cl. 260—758)

This invention relates to improvements in the manufacture of rubber stock and more particularly to a novel process of compounding rubber and to a novel composition for use in such process.

In the manufacture of vulcanized rubber articles, it is customary to add compounding materials to the rubber batch for softening the rubber to facilitate milling, impart the desired working characteristics, e. g. molding and extrusion properties, and effect pigmentation of the rubber stock. Coke oven tar pitches possess advantageous rubber-softening and pigmentation properties and impart to the rubber desirable working characteristics. It has been found, however, that in some cases the use of coke oven tar pitches as rubber-compounding materials is subject to the disadvantage that vulcanized rubber stocks in which such pitches have been incorporated have a tendency to develop a dirty, brownish or greenish surface discoloration, known in the rubber trade as "bloom," within a few weeks or months after vulcanization. The avoidance of bloom is of especial importance to the manufacturers and distributors of rubber goods since it involves loss of sales and good will and entails the expense of replacing unsatisfactory articles. While the causes of bloom are not fully understood, it is believed to be due in part at least to migration to the surface of the stock of materials of limited solubility in rubber when other incompatible ingredients are present. Whatever may be the reason for bloom, it has been found that it is especially likely to occur when vulcanized rubber articles have been wrapped or packaged so as to prevent free circulation of air over the surface of the rubber.

It is an object of this invention to provide a novel process of compounding rubber for the manufacture of rubber stock free from objectionable blooming tendencies. The invention also comprehends a novel rubber-compounding composition of matter for use as a rubber softener without imparting objectionable blooming tendencies to the rubber stock.

In accordance with the invention, I incorporate in the rubber mix, pitch residue resulting from distillation of water gas tar to soften the rubber, facilitate working of the mix and to impart the desired characteristics to the rubber stock. I preferably employ as the softening agent pitch residue of a softening point (ring and ball) falling within the range of 165° F. to 235° F. and a penetration of 25° C., 200 grams, and 5 seconds of from 0 to 20, resulting from the distillation of heavy water gas tar. I have found that when water gas tar pitch softening agent is mixed with batches of rubber stocks and the stocks milled, vulcanized and cured, the resultant vulcanized rubber may be stored indefinitely without developing objectionable bloom.

The invention also comprehends blending with the water gas tar pitch prior to incorporating it in the rubber mix, a plasticizing and lubricating agent which softens the pitch, reduces its brittleness and tendency to scatter during milling and lubricates the pitch to render it less tacky, thereby preventing sticking of the rubber to the mill rolls and improving the processing properties of the mix. Materials having softening and lubricating properties and which form a homogeneous mixture when blended with water gas tar pitch in the desired proportions are in general suitable for accomplishing the desired results. A large number of such plasticizing and lubricating agents have been found to impart the desired properties to water gas tar pitch, in particular high-molecular-weight aliphatic materials, especially fatty oils, high molecular weight fatty acids and their derivatives, and asphaltic materials, particularly natural asphalt.

The water gas tar pitch employed may be produced by distilling heavy water gas tar, i. e. water gas tar of specific gravity above 1.1, specific viscosity (Engler) above 6 for 100 c.c. at 40 C., and having a free carbon content in excess of 1% until a pitch residue having a softening point preferably falling within the range of from 165° F. to 235° F. is produced. While I prefer to employ pitch resulting from the distillation of heavy water gas tar, pitches derived from other water gas tar may also be utilized with advantage for compounding rubber. Water gas tar, as is well known in the water gas industry, is obtained in the cooling and washing of carburetted water gas usually made by blasting a fuel bed with air and alternately passing steam through the hot fuel bed, the resultant water gas being enriched by the addition thereto of oil vapors produced by the cracking of petroleum oil including residues and distillates of petroleum oil. Heavy water gas tar results when heavy oils such as Bunker C for oil or residuums are used to enrich the water gas; light water gas tars usually result when gas oil is used to enrich the water gas. Water gas tar differs in its chemical and physical properties from coke oven tars.

As illustrative of the use of water gas tar pitch for compounding rubber in accordance with the invention, the following examples of the incorporation of the pitch in rubber mixes are given:

Example I

A suitable composition for the manufacture of black rubber soling stock is as follows, parts being by weight:

| | |
|---|---:|
| Smoked sheet rubber | 40.000 |
| Heavy water gas tar pitch | 20.000 |
|     Softening point (ring and ball) __°F__ | 189 |
|     Penetrations, 200 grams, 5 seconds at— | |
|         25° C | 2 |
|         40° C | 24 |
|         46.1° C | 55 |
|         50° C | 146 |
|         60° C | 315 |
|         70° C | 355+ |
|     Benzol insoluble___per cent__ | 20.7 |
| Carbon black | 34.125 |
| Zinc oxide | 3.000 |
| Stearic acid | 0.500 |
| Sulfur | 1.625 |
| Benzothiazyl disulfide (Altax) | 0.500 |
| Diorthotolylguanidine (D. O. T. G.) | 0.250 |
| | 100.000 |

The above ingredients were assembled and milled in the customary manner, the milled product was then cured for twelve minutes at 316° F.

Example II

A product was prepared in the same manner and with similar materials except that instead of the water gas tar pitch of Example I there were employed 20 parts by weight of heavy water gas tar pitch of a softening point (ring and ball) of 203° F., a benzol insoluble content of 24.6 per cent, and penetrations (200 grams, 5 seconds) as follows: at 25° C.—1; at 40° C.—16; at 46.1° C.—41; at 50° C.—85; at 60° C.—223; at 70° C.—355+.

Example III

A product was prepared in the same manner and with similar materials as in the foregoing examples except that instead of the heavy water gas tar pitch of such examples, there were employed 20 parts by weight of heavy water gas tar pitch of a softening point (ring and ball) of 210° F., a benzol insoluble content of 29.3 per cent, and penetrations (200 grams, 5 seconds) as follows: at 25° C.—0.5+; at 40° C.—5; at 46.1° C.—20; at 50° C.—38; at 60° C.—84; at 70° C.—252.

Example IV

A product was prepared in the same manner as in the foregoing examples using similar materials except that there were employed 20 parts of heavy water gas tar pitch of a softening point (ring and ball) of 234° F., a benzol insoluble content of 32.5 per cent, and penetrations (200 grams, 5 seconds) as follows: at 25° C.—0.5; at 40° C.—1; at 46.1° C.—7; at 50° C.—19; at 60° C.—34; at 70° C.—72.

The cured rubber stocks of Examples I to IV inclusive exhibited no tendency to bloom after storage for eighteen weeks. The stocks were subjected to plasticity, abrasion, tear, flexing, tensile, and hardness tests. The results of these tests showed the stocks to possess satisfactory properties; for example, the results of the tensile and hardness tests on the stocks (A) before aging and (B) after aging for fourteen days at 70° C. are as follows:

| | Example I | Example II | Example III | Example IV |
|---|---:|---:|---:|---:|
| A. Unaged stock: | | | | |
|   Tensile breaking point____pounds__ | 2,370 | 2,520 | 2,360 | 2,280 |
|   Elongation at breaking point_percent__ | 370 | 370 | 360 | 320 |
|   Hardness_____Shore__ | 90 | 89 | 88 | 88 |
| B. Stock aged 14 days at 70° C.: | | | | |
|   Tensile breaking point____pounds__ | 1,840 | 1,700 | 1,710 | 1,840 |
|   Elongation at breaking point_percent__ | 240 | 220 | 200 | 230 |
|   Hardness_____Shore__ | 94 | 93 | 93 | 93 |

Example V

The following ingredients were mixed in a manner similar to Example I and cured for thirty minutes at a temperature of 281° F. for the manufacture of black rubber compounds:

| | A | B | C | D |
|---|---:|---:|---:|---:|
| | Parts by weight | Parts by weight | Parts by weight | Parts by weight |
| Smoked sheet rubber | 100 | 100 | 100 | 100 |
| Heavy water gas tar pitch of a softening point (ring and ball) of 210° F | 25 | | 50 | |
| Coke oven tar pitch of a softening point (ring and ball) of 184° F | | 25 | | 50 |
| Carbon black | 50 | 50 | 50 | 50 |
| Zinc oxide | 10 | 10 | 10 | 10 |
| Antioxidant (phenyl-beta-naphthylamine) | 1 | 1 | 1 | 1 |
| Stearic acid | 4 | 4 | 4 | 4 |
| Sulfur | 3 | 3 | 3 | 3 |
| Mercaptobenzothiazole (captax) | 1 | 1 | 1 | 1 |
| | 194 | 194 | 219 | 219 |

The vulcanized stocks were inspected for bloom after aging for 5 and 10 weeks; the results of the observations are tabulated below:

| | A | B | C | D |
|---|---|---|---|---|
| After 5 weeks | None | Green | None | Green. |
| After 10 weeks | ___do___ | ___do___ | ___do___ | Do. |

It will be observed that stocks A and C containing water gas tar pitch exhibited no tendency to bloom while stocks B and D containing coke oven tar pitch developed bloom within 5 weeks after vulcanization.

It was found that vulcanized stocks B and D containing coke oven tar pitch were harder than stocks A and C respectively containing water gas tar pitch and the hardness of the stocks containing water gas tar pitch may be increased by adding thereto larger amounts of carbon black. Since carbon black is a relatively inexpensive ingredient, vulcanized rubber stocks of similar hardness may be manufactured more economically using water gas tar pitch than coke oven tar pitch as a compounding material.

While water gas tar pitch alone is a satisfactory compounding material for rubber, I have found the processing properties of the rubber mix may be improved by adding to the pitch prior to mixing it with the rubber a plasticizing and lubricating agent which reduces the brittleness of the pitch with consequent reduction of the tendency of the pitch to fly from the rubber mix during milling and which has a lubricating action preventing sticking of the mix to the mill rolls. In general many vegetable oils and fats, animal oils and greases, mineral oils and waxes, aliphatic acids and derivatives thereof, and asphalts impart improved processing properties to the pitch. I prefer to employ high-molecular-weight aliphatic materials, especially fatty oils such as palm oil and corn oil, high molecular weight fatty acids such as stearic acid and corn oil fatty acid, and aliphatic acid derivatives such as oleic alcohol and diglycol laurate alone or in conjunction with asphalt for plasticizing and lubricating the pitch in accordance with the invention. The proportions in which the plasticizing and lubricating agents employed may be added to the pitch may vary to a considerable extent; I prefer to employ from 5 to 10 per cent, based on the weight of the water gas tar pitch, although from 2 to 20 per cent may be employed in some cases.

As illustrative of blends of water gas tar pitch and plasticizing and lubricating agents, the following examples are given, parts being by weight: Water gas tar pitch 98 parts, palm oil 2 parts; water gas tar pitch 95 parts, palm oil 5 parts; water gas tar pitch 90 parts, palm oil 10 parts; water gas tar pitch 85 parts, palm oil 15 parts; water gas tar pitch 80 parts, palm oil 20 parts; water gas tar pitch 92.5 parts, palm oil 2.5 parts, Bermudez asphalt 5 parts. Water gas tar pitch may also be blended with the following plasticizing and lubricating agents, preferably in proportions of from 90 to 95 parts of the pitch to 5 to 10 parts of the plasticizing and lubricating agent: corn oil, corn oil fatty acid, stearic acid, oleic alcohol and diglycol laurate.

The ingredients of each example were melted together and after stirring until the materials are well mixed, were allowed to cool. The resultant compositions exhibited the properties of a homogeneous blend.

The blends of water gas tar pitch and the plasticizing and lubricating agents possess less susceptibility to temperature changes and mix more readily with rubber than water gas tar pitch alone. Furthermore, rubber mixes in which the blends are incorporated mill smoothly and uniformly without objectionable flying of the pitch or sticking of the mix to the mill rolls.

From the above description of the invention, it will be appreciated that vulcanized rubber stocks compounded with water gas tar pitch softener in accordance with the invention are not subject to the objectionable tendencies to develop bloom which characterizes stocks compounded with coke oven tar pitch. Furthermore, the milling properties of water gas tar pitch are improved by blending therewith minor proportions of plasticizing and lubricating agents which reduce the brittleness of the pitch and prevent sticking of the rubber mix to the mixing rolls.

While the preferred ratio of heavy water gas tar pitch to rubber hydrocarbon (as illustrated in the above examples) lies in the range 1:4 to 1:2, this pitch in some formulas may show the advantages described in as small a ratio as 1:5, and in other formulations may be used in an even greater ratio than 1:2.

Softening points, penetrations, tensile breaking points, elongation and hardnness given herein were determined in accordance with tests prescribed by the American Society for Testing Materials. Specific viscosities, i. e. the ratios obtained by dividing the time of flow of the material by the time of flow of an equal volume of water at 25.0° C. were determined by Test B-10 Viscosity, Engler), sheets #25 and #26, in "Methods of Testing Coal Tar Products," copyrighted by The Barrett Company, 1931.

I claim:

1. In a process of compounding rubber to form a non-blooming rubber, the steps comprising mixing rubber with the pitch residue resulting from the distillation of water gas tar, the ratio of the pitch to the rubber hydrocarbon falling within the range 1:5 to 1:2, said pitch having a softening point (ring and ball) falling within the range of about from 165° F. to 235° F., and milling the mixture.

2. In a process of compounding rubber to form a non-blooming rubber, the steps comprising blending pitch residue resulting from the distillation of water gas tar with asphalt for the pitch, mixing the blend of pitch and asphalt with rubber, in such quantity that the ratio of the pitch to the rubber hydrocarbon falls within the range 1:5 to 1:2, and milling the mixture.

3. In a process of compounding rubber to form a non-blooming rubber the steps comprising blending pitch residue resulting from distillation of water gas tar with a minor proportion of high-molecular-weight aliphatic plasticizing and lubricating agent for the pitch, mixing the resultant blend with rubber, in such quantity that the ratio of the pitch to the rubber hydrocarbon falls within the range 1:5 to 1:2, and milling the mixture.

4. In a process of producing non-blooming vulcanized rubber the steps comprising blending water gas tar pitch of a softening point (ring and ball) of from 165° F. to 235° F. with a minor proportion of high-molecular-weight vegetable fatty oil plasticizing and lubricating agent, mixing the resultant blend with rubber, in such quantity that the ratio of the pitch to the rubber hydrocarbon falls within the range 1:5 to 1:2, and milling the mixture.

5. In a process of producing non-blooming vulcanized rubber stock the steps comprising blending water gas tar pitch of a softening point (ring and ball) of from 165° F. to 235° F. with from 2 to 20 per cent of palm oil, mixing the resultant blend with rubber, in such quantity that the ratio of the pitch to the rubber hydrocarbon falls within the range 1:5 to 1:2, and milling the mixture.

6. In a process of compounding rubber to form a non-blooming rubber, the steps comprising blending water gas tar pitch with a minor proportion of palm oil and Bermudez asphalt, mixing the resultant blend with rubber, in such quantity that the ratio of the pitch to the rubber hydrocarbon falls within the range 1:5 to 1:2, and milling the mixture.

7. A composition for addition to rubber stock to facilitate milling and impart improved working characteristics, comprising a major proportion of water gas tar pitch and a minor proportion of high molecular-weight aliphatic plasticizing and lubricating agent, obtained by melting the water gas tar pitch, blending the plasticizing and lubricating agent with the melted pitch and cooling to produce a uniformly blended product.

8. In a process of producing non-blooming vulcanized rubber the steps comprising incorporating water gas tar pitch and a vulcanizing agent in rubber, the ratio of the pitch to the rubber hydrocarbon falling within the range 1:4 to 1:2 and vulcanizing the mixture.

9. A composition for addition to rubber stock to facilitate milling and impart improved working characteristics, comprising a major proportion of water gas tar pitch and a minor proportion of high-molecular-weight aliphatic plasticizing and lubricating agent for the pitch.

10. A composition for addition to rubber stock to faciiltate milling and impart improved working characteristics, comprising from about 80 to 98 per cent water gas tar pitch and from about 2 to 20 per cent of vegetable fatty oil blended therewith.

11. A solid non-blooming vulcanized rubber product containing reacted vulcanizing material and a blend of water gas tar pitch with a high-molecular weight aliphatic plasticizing and lubricating agent, the ratio of the pitch to the rubber hydrocarbon falling within the range of 1:5 to 1:2.

12. A solid non-blooming vulcanized rubber product containing reacted vulcanizing material and water gas tar pitch, the ratio of the pitch to the rubber constituent of the product falling within the range 1:4 to 1:2.

13. The process of manufacturing solid, vulcanized non-blooming resilient rubber products which comprises compounding rubber with water gas tar pitch and a vulcanizing agent, the amount of water gas tar pitch incorporated in the rubber being sufficient to soften and materially facilitate working of the rubber but not greater than 1 part by weight of the pitch to each 2 parts by weight of the rubber, and vulcanizing the resultant rubber compound.

14. A solid resilient non-blooming vulcanized rubber product containing reacted vulcanizing material and water gas tar pitch, the amount of water gas tar pitch being sufficient to soften and facilitate working of the rubber prior to vulcanization but not greater than 1 part by weight of the pitch for each 2 parts by weight of the rubber constituent of the product.

THEODORE ADOLPH BULIFANT.